United States Patent
Saulsbury

(10) Patent No.: US 7,028,170 B2
(45) Date of Patent: Apr. 11, 2006

(54) PROCESSING ARCHITECTURE HAVING A COMPARE CAPABILITY

(75) Inventor: Ashley Saulsbury, Los Altos, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 489 days.

(21) Appl. No.: 09/802,291

(22) Filed: Mar. 8, 2001

(65) Prior Publication Data

US 2002/0019928 A1  Feb. 14, 2002

Related U.S. Application Data

(60) Provisional application No. 60/187,651, filed on Mar. 8, 2000.

(51) Int. Cl.
G06F 9/305 (2006.01)

(52) U.S. Cl. .................................... 712/223
(58) Field of Classification Search ............. 712/222, 712/223, 224
See application file for complete search history.

(56) References Cited

U.S. PATENT DOCUMENTS

| 4,542,456 | A |   | 9/1985  | Hill |
| 4,833,599 | A | * | 5/1989  | Colwell et al. ............ 712/236 |
| 5,517,628 | A | * | 5/1996  | Morrison et al. .......... 712/234 |
| 5,687,338 | A |   | 11/1997 | Boggs et al. |
| 5,838,986 | A |   | 11/1998 | Garg et al. |
| 5,900,011 | A |   | 5/1999  | Saulsbury et al. |
| 5,909,572 | A |   | 6/1999  | Thayer et al. |
| 5,933,650 | A |   | 8/1999  | van Hook et al. |
| 6,014,723 | A |   | 1/2000  | Tremblay et al. |
| 6,035,390 | A |   | 3/2000  | Burns et al. |
| 6,085,208 | A |   | 7/2000  | Oberman et al. |
| 6,128,702 | A |   | 10/2000 | Saulsbury et al. |
| 6,574,728 | B1| * | 6/2003  | Chayut ..................... 712/234 |

FOREIGN PATENT DOCUMENTS

| EP |    0 540 155 A2 | 5/1993 |
| EP |    0 540 155 A3 | 5/1993 |
| WO | WO 80/01423 A1  | 7/1980 |

OTHER PUBLICATIONS

Alpha Architecture Handbook, Rev.4, Order No. EC-QD2Kc-TE, p. 3-2, p. 4-62, p. 4-113, Compaq Computer Corporation, Oct. 1998.*
Patterson and Hennessy, Computer Organization and Design, 2nd Ed., 1998, Morgan Kaufmann Publishers, p. 230-231.*

(Continued)

Primary Examiner—Eddie Chan
Assistant Examiner—Aimee J. Li
(74) Attorney, Agent, or Firm—Townsend and Townsend and Crew LLP

(57) ABSTRACT

According to the invention, a processing core that executes a compare instruction is disclosed. The processing core includes a register file, comparison logic, decode logic, and a store path. Included in the register file are a number of general-purpose registers. The general-purpose registers include a first input operand register, a second input operand register and an output operand register. Comparison logic is coupled to the register file. The comparison logic tests for at least two of the following relationships: less than, equal to, greater than and no valid relationship. The decode logic selects the output operand register from the plurality of general-purpose registers. The store path extends between the comparison logic and the selected output operand register.

20 Claims, 6 Drawing Sheets

OTHER PUBLICATIONS

Compaq Computer Corporation. "Alpha Architecture Handbook", ©1998. pp. 4-95.*

Macromedia Flash Support Center. "ActionScript Dictionary", ©1995-2005. http://www.macromedia.com/support/flash/action_scripts/actionscript_dictionary/actionscript_dictionary039.html.*

FunctionX. "Logical Operators and Functions: Logical Operators". http://www.functionx.com/excel/Lesson15.htm Term: Less than or equal to >x.*

Hennessy, John L. and Patterson, David A. "Computer Organization and Design: The Hardware/Software Interface". Second Edition. San Francisco, CA: Morgan Kaufmann Publishers, Inc. ©1998. pp. 106-107; 275-280; and 343-377.*

Kernighan, Brian W. and Ritchie, Dennis M. "The C Programming Language". Englewood Cliffs, N.J.: Prentice-Hall, Inc., ©1978. pp. ix-x and 99-102.*

"UltraSPARC™ The Visual Instruction Set (VIS™): On Chip Support for New-Media Processing," Sun Microsystems, Hardward & Networking, Microelectronics, White Paper, Retrieved from the Internet: http://www.sun.com/microelectronics/whitepapers/ wp95-022, printed Jun. 4, 1999.

8XC251SB Embedded Microcontroller User's Manual, Order No. 272617-001, Intel, Feb. 1995, A1-A144.

Manual for M32000D3FP, Single Chip 32-Bit CMOS Microcomputer, Mitsubishi Microcomputers, Mitsubishi Electric, May 1998.

Subramania Sudharsanan, "MAJC-5200: A High Perfromance Microprocessor for Multimedia Computing," Sun Microsystems, Inc., Paul Alto, CA.

VIS™ Instruction Set User's Manual, Sun Microsystems, Inc., Palo Alto, CA, Mar. 2000.

VIS™ Instructions Set User's Manual, Sun Microsystems, Sun Microelectronics, Mountain View, CA, Part No.: 805-1394-01, Jul. 1997.

Ruby B. Lee, Hewlett-Packard, "Subword Parallelism with MAX-2," Aug. 1996 IEEE.

* cited by examiner

FPCMP Register Sub-Instruction: Floating Point Elements

PROCESSING ARCHITECTURE HAVING A COMPARE CAPABILITY

This application claims the benefit of U.S. Provisional Application No. 60/187,651 filed on Mar. 8, 2000.

CROSS-REFERENCES TO RELATED APPLICATIONS

This application is being filed concurrently with related U.S. patent applications: Ser. No. 09/802,017 filed Mar. 8, 2001, entitled "VLIW Computer Processing Architecture with On-chip DRAM Usable as Physical Memory or Cache Memory"; Ser. No. 09/802,289 filed Mar. 8, 2001, entitled "VLIW Computer Processing Architecture Having a Scalable Number of Register Files"; Ser. No. 09/802,108 filed Mar. 8, 2001, entitled "Computer Processing Architecture Having a Scalable Number of Processing Paths and Pipelines"; Ser. No. 09/802,234 now U.S. Pat. No. 6,631,439 issued Oct. 7, 2003, entitled "VLIW Computer Processing Architecture with On-chip Dynamic RAM"; Ser. No. 09/802,120 filed Mar. 8, 2001, entitled "VLIW Computer Processing Architecture Having the Program Counter Stored in a Register File Register"; Ser. No. 09/801,564 filed Mar. 8, 2001, entitled "Processing Architecture Having Parallel Arithmetic Capability"; Ser. No. 09/802,196 filed Mar. 8, 2001, entitled "Processing Architecture Having an Array Bounds Check Capability"; Ser. No. 09/802,121 filed Mar. 8, 2001, entitled "Processing Architecture Having Field Swapping Capability"; and, Ser. No. 09/802,020 filed Mar. 8, 2001, entitled "Processing Architecture Having a Matrix-Transpose Capability"; all of which are incorporated herein by reference.

BACKGROUND OF THE INVENTION

The present invention relates generally to an improved computer processing instruction set, and more particularly to an instruction set having a compare functionality.

Computer architecture designers are constantly trying to increase the speed and efficiency of computer processors. For example, computer architecture designers have attempted to increase processing speeds by increasing clock speeds and attempting latency hiding techniques, such as data prefetching and cache memories. In addition, other techniques, such as instruction-level parallelism using VLIW, multiple-issue superscalar, speculative execution, scoreboarding, and pipelining are used to further enhance performance and increase the number of instructions issued per clock cycle (IPC).

Architectures that attain their performance through instruction-level parallelism seem to be the growing trend in the computer architecture field. Examples of architectures utilizing instruction-level parallelism include single instruction multiple data (SIMD) architecture, multiple instruction multiple data (MIMD) architecture, vector or array processing, and very long instruction word (VLIW) techniques. Of these, VLIW appears to be the most suitable for general-purpose computing.

Instruction sets typically include one or more compare instructions. These instructions compare two input registers so that decisions can be made based upon the result. For example, a branch in software is a compare function followed by checking the result to decide which branch to follow. The output from the compare instruction travels through a dedicated path to a dedicated output register. However, use of a single dedicated register is undesirable in VLIW systems because two separate data paths may want to access the dedicated register at the same time. To accommodate a single dedicated output register, a VLIW system would schedule compare instructions so that none overlapped. Additionally, use of a dedicated path to the output register consumes die area and increases the circuit complexity.

Compare instructions only determine a single relationship between two numbers. For example, a compare instruction answers the question of whether one number is either less than, greater than or equal to another number with a response of true or false. However, separate compare instructions are needed if answers to multiple compare-type questions are needed. As the compare instructions needed for answering multiple questions are executed sequentially, this extends the time needed to answer a multitude of compare-type questions.

SUMMARY OF THE INVENTION

The present invention compares source operands and stores a result in a register where the result indicates a plurality of mathematical relationships between the source operands. In one embodiment, a processing core executes a compare instruction. The processing core includes a register file, comparison logic, decode logic, and a store path. Included in the register file are a number of general-purpose registers. The general-purpose registers include a first input operand register, a second input operand register and an output operand register. Comparison logic is coupled to the register file. The comparison logic tests for at least two of the following relationships: less than, equal to, greater than and no valid relationship. The decode logic selects the output operand register from the plurality of general-purpose registers. The store path extends between the comparison logic and the selected output operand register.

A more complete understanding of the present invention may be derived by referring to the detailed description of preferred embodiments and claims when considered in connection with the figures, wherein like reference numbers refer to similar items throughout the figures.

DESCRIPTION OF THE SPECIFIC EMBODIMENTS

Introduction

The present invention provides a novel computer processor chip having a sub-instruction for comparing registers which performs multiple comparisons on input registers. The result from the comparison is stored in a general-purpose register in the register file. As one skilled in the art will appreciate, performing multiple compares in a single instruction issue increases efficiency. Additionally, storing the result in general-purpose register file improves efficiency in architectures which issues compares either simultaneously or in quick succession to each other. The result indicates a number of mathematical relationships between the source operands without issuing separate instructions.

In the Figures, similar components and/or features have the same reference label. Further, various components of the same type are distinguished by following the reference label by a dash and a second label that distinguishes among the similar components. If only the first reference label is used in the specification, the description is applicable to any one of the similar components having the second label.

Processor Overview

Figure 1:
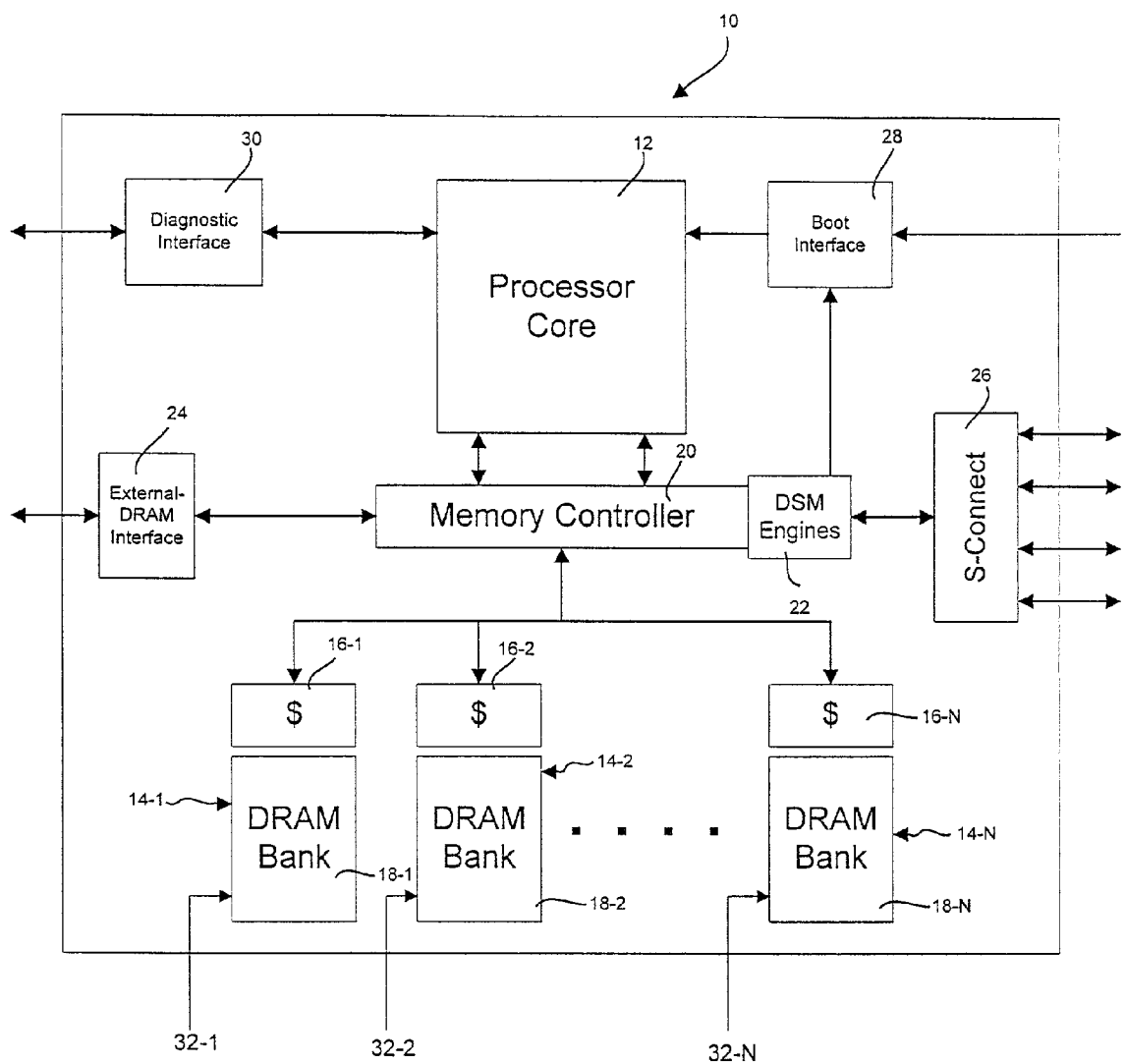
FIG. 1 is a block diagram of an embodiment of a processor chip having the processor logic and memory on the same integrated circuit.

With reference to FIG. 1, a processor chip 10 is shown which embodies the present invention. In particular, processor chip 10 comprises a processing core 12, a plurality of memory banks 14, a memory controller 20, a distributed shared memory controller 22, an external memory interface 24, a high-speed I/O link 26, a boot interface 28, and a diagnostic interface 30.

As discussed in more detail below, processing core 12 comprises a scalable VLIW processing core, which may be configured as a single processing pipeline or as multiple processing pipelines. The number of processing pipelines typically is a function of the processing power needed for the particular application. For example, a processor for a personal workstation typically will require fewer pipelines than are required in a supercomputing system.

In addition to processing core 12, processor chip 10 comprises one or more banks of memory 14. As illustrated in FIG. 1, any number of banks of memory can be placed on processor chip 10. As one skilled in the art will appreciate, the amount of memory 14 configured on chip 10 is limited by current silicon processing technology. As transistor and line geometries decrease, the total amount of memory that can be placed on a processor chip 10 will increase.

Connected between processing core 12 and memory 14 is a memory controller 20. Memory controller 20 communicates with processing core 12 and memory 14, and handles the memory I/O requests to memory 14 from processing core 12 and from other processors and I/O devices. Connected to memory controller 20 is a distributed shared memory (DSM) controller 22, which controls and routes I/O requests and data messages from processing core 12 to off-chip devices, such as other processor chips and/or I/O peripheral devices. In addition, as discussed in more detail below, DSM controller 22 is configured to receive I/O requests and data messages from off-chip devices, and route the requests and messages to memory controller 20 for access to memory 14 or processing core 12.

High-speed I/O link 26 is connected to the DSM controller 22. In accordance with this aspect of the present invention, DSM controller 22 communicates with other processor chips and I/O peripheral devices across the I/O link 26. For example, DSM controller 22 sends I/O requests and data messages to other devices via I/O link 26. Similarly, DSM controller 22 receives I/O requests from other devices via the link.

Processor chip 10 further comprises an external memory interface 24. External memory interface 24 is connected to memory controller 20 and is configured to communicate memory I/O requests from memory controller 20 to external memory. Finally, as mentioned briefly above, processor chip 10 further comprises a boot interface 28 and a diagnostic interface 30. Boot interface 28 is connected to processing core 12 and is configured to receive a bootstrap program for cold booting processing core 12 when needed. Similarly, diagnostic interface 30 also is connected to processing core 12 and configured to provide external access to the processing core for diagnostic purposes.

Processing Core

1. General Configuration

As mentioned briefly above, processing core 12 comprises a scalable VLIW processing core, which may be configured as a single processing pipeline or as multiple processing pipelines. A single processing pipeline can function as a single pipeline processing one instruction at a time, or as a single VLIW pipeline processing multiple sub-instructions in a single VLIW instruction word. Similarly, a multi-pipeline processing core can function as multiple autonomous processing cores. This enables an operating system to dynamically choose between a synchronized VLIW operation or a parallel multi-threaded paradigm. In multi-threaded mode, the VLIW processor manages a number of strands executed in parallel.

In accordance with one embodiment of the present invention, when processing core 12 is operating in the synchronized VLIW operation mode, an application pro gram compiler typically creates a VLIW instruction word comprising a plurality of sub-instructions appended together, which are then processed in parallel by processing core 12. The number of sub-instructions in the VLIW instruction word matches the total number of available processing paths in the processing core pipeline. Thus, each processing path processes VLIW sub-instructions so that all the sub-instructions are processed in parallel. In accordance with this particular aspect of the present invention, the sub-instructions in a VLIW instruction word issue together in this embodiment. Thus, if one of the processing paths is stalled, all the sub-instructions will stall until all of the processing paths clear. Then, all the sub-instructions in the VLIW instruction word will issue at the same time. As one skilled in the art will appreciate, even though the sub-instructions issue simultaneously, the processing of each sub-instruction may complete at different times or clock cycles, because different sub-instruction types may have different processing latencies.

In accordance with an alternative embodiment of the present invention, when the multi-pipelined processing core is operating in the parallel multi-threaded mode, the program sub-instructions are not necessarily tied together in a VLIW instruction word. Thus, as instructions are retrieved from an instruction cache, the operating system determines which pipeline is to process each sub-instruction for a strand. Thus, with this particular configuration, each pipeline can act as an independent processor, processing a strand independent of strands in the other pipelines. In addition, in accordance with one embodiment of the present invention, by using the multi-threaded mode, the same program sub-instructions can be processed simultaneously by two separate pipelines using two separate blocks of data, thus achieving a fault tolerant processing core. The remainder of the discussion herein will be directed to a synchronized VLIW operation mode. However, the present invention is not limited to this particular configuration.

2. Very Long Instruction Word (VLIW)

Figure 2:
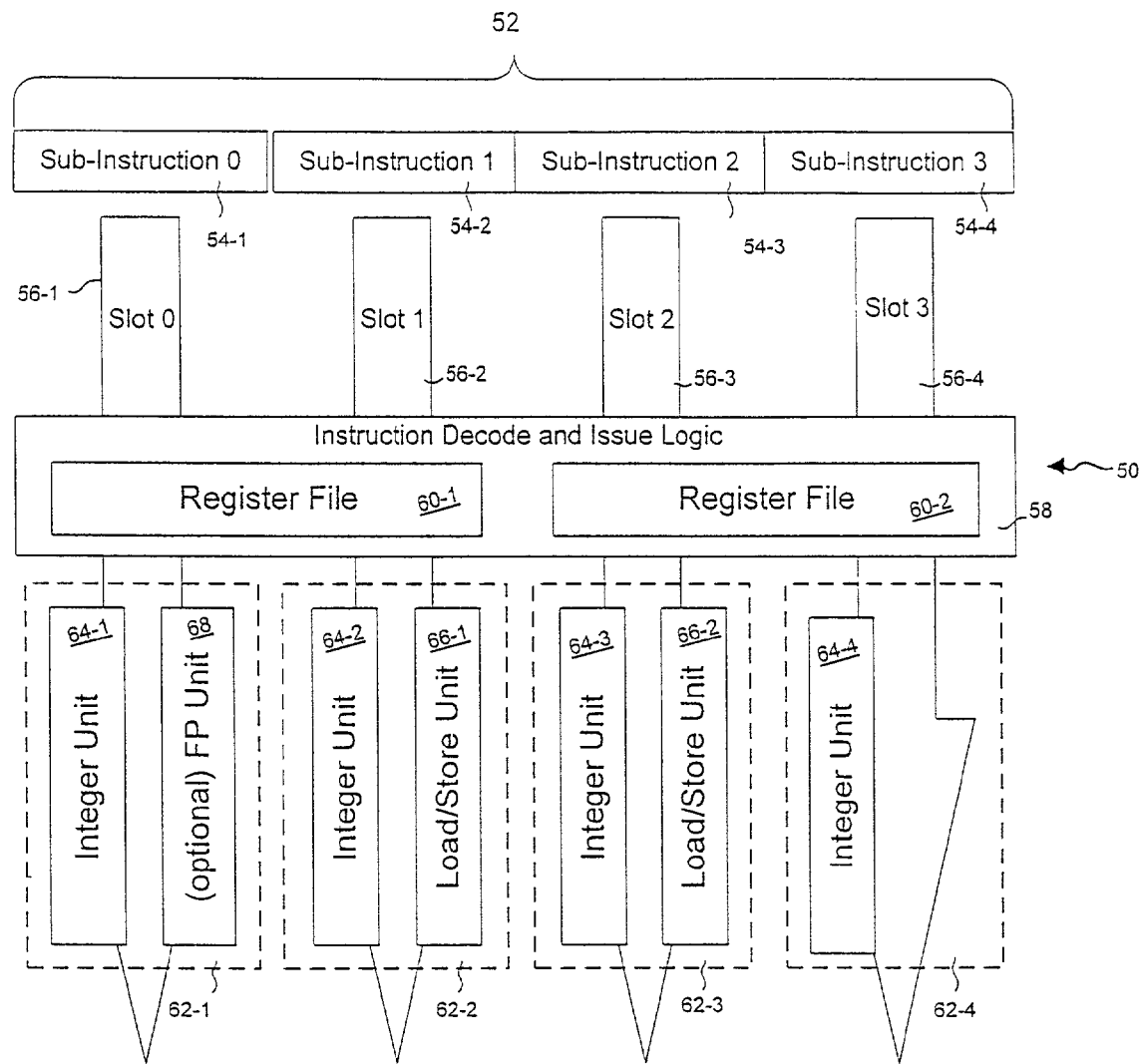
FIG. 2 is block diagram illustrating one embodiment of a processing core having a four-way VLIW pipeline design.

Referring now to FIG. 2, a simple block diagram of a VLIW processing core pipeline 50 having four processing paths, 56-1 to 56-4, is shown. In accordance with the illustrated embodiment, a VLIW 52 comprises four RISC-like sub-instructions, 54-1, 54-2, 54-3, and 54-4, appended together into a single instruction word. For example, an instruction word of one hundred and twenty-eight bits is divided into four thirty-two bit sub-instructions. The number of VLIW sub-instructions 54 correspond to the number of processing paths 56 in processing core pipeline 50. Accordingly, while the illustrated embodiment shows four sub-instructions 54 and four processing paths 56, one skilled in the art will appreciate that the pipeline 50 may comprise any number of sub-instructions 54 and processing paths 56. Typically, however, the number of sub-instructions 54 and processing paths 56 is a power of two.

Each sub-instruction 54 in this embodiment corresponds directly with a specific processing path 56 within the pipeline 50. Each of the sub-instructions 54 are of similar format and operate on one or more related register files 60. For example, processing core pipeline 50 may be configured so that all four sub-instructions 54 access the same register file, or processing core pipeline 50 may be configured to have multiple register files 60. In accordance with the illustrated embodiment of the present invention, sub-instructions 54-1 and 54-2 access register file 60-1, and sub-instructions 54-3 and 54-4 access register file 60-2. As those skilled in the art can appreciate, such a configuration can help improve performance of the processing core.

As illustrated in FIG. 2, an instruction decode and issue logic stage 58 of the processing core pipeline 50 receives VLIW instruction word 52 and decodes and issues the sub-instructions 54 to the appropriate processing paths 56. Each sub-instruction 54 then passes to the execute stage of pipeline 50 which includes a functional or execute unit 62 for each processing path 56. Each functional or execute unit 62 may comprise an integer processing unit 64, a load/store processing unit 66, a floating point processing unit 68, or a combination of any or all of the above. For example, in accordance with the particular embodiment illustrated in FIG. 2, the execute unit 62-1 includes an integer processing unit 64-1 and a floating point processing unit 68; the execute unit 62-2 includes an integer processing unit 64-2 and a load/store processing unit 66-1; the execute unit 62-3 includes an integer processing unit 64-3 and a load/store unit 66-2; and the execute unit 62-4 includes only an integer unit 64-4.

As one skilled in the art will appreciate, scheduling of sub-instructions within a VLIW instruction word 52 and scheduling the order of VLIW instruction words within a program is important so as to avoid unnecessary latency problems, such as load, store and writeback dependencies. In accordance with the one embodiment of the present invention, the scheduling responsibilities are primarily relegated to the software compiler for the application programs. Thus, unnecessarily complex scheduling logic is removed from the processing core, so that the design implementation of the processing core is made as simple are possible. Advances in compiler technology thus result in improved performance without redesign of the hardware. In addition, some particular processing core implementations may prefer or require certain types of instructions to be executed only in specific pipeline slots or paths to reduce the overall complexity of a given device. For example, in accordance with the embodiment illustrated in FIG. 2, since only processing path 56-1, and in particular execute unit 62-1, include a floating point processing unit 68, all floating point sub-instructions are dispatched through path 56-1. As discussed above, the compiler is responsible for handling such issue restrictions in this embodiment.

In accordance with a one embodiment of the present invention, all of the sub-instructions 54 within a VLIW instruction word 52 issue in parallel. Should one of the sub-instructions 54 stall (i.e., not issue), for example due to an unavailable resource, the entire VLIW instruction word 52 stalls until the particular stalled sub-instruction 54 issues. By ensuring that all sub-instructions within a VLIW instruction word 52 issue simultaneously, the implementation logic is dramatically simplified.

3. Data Types

The registers within the processor chip are arranged in varying data types. By having a variety of data types, different data formats can be held in a register. For example, there may be different data types associated with signed integer, unsigned integer, single-precision floating point, and double-precision floating point values. Additionally, a register may be subdivided or partitioned to hold a number of values in separate fields. These subdivided registers are operated upon by single instruction multiple data (SIMD) instructions.

Figure 3:
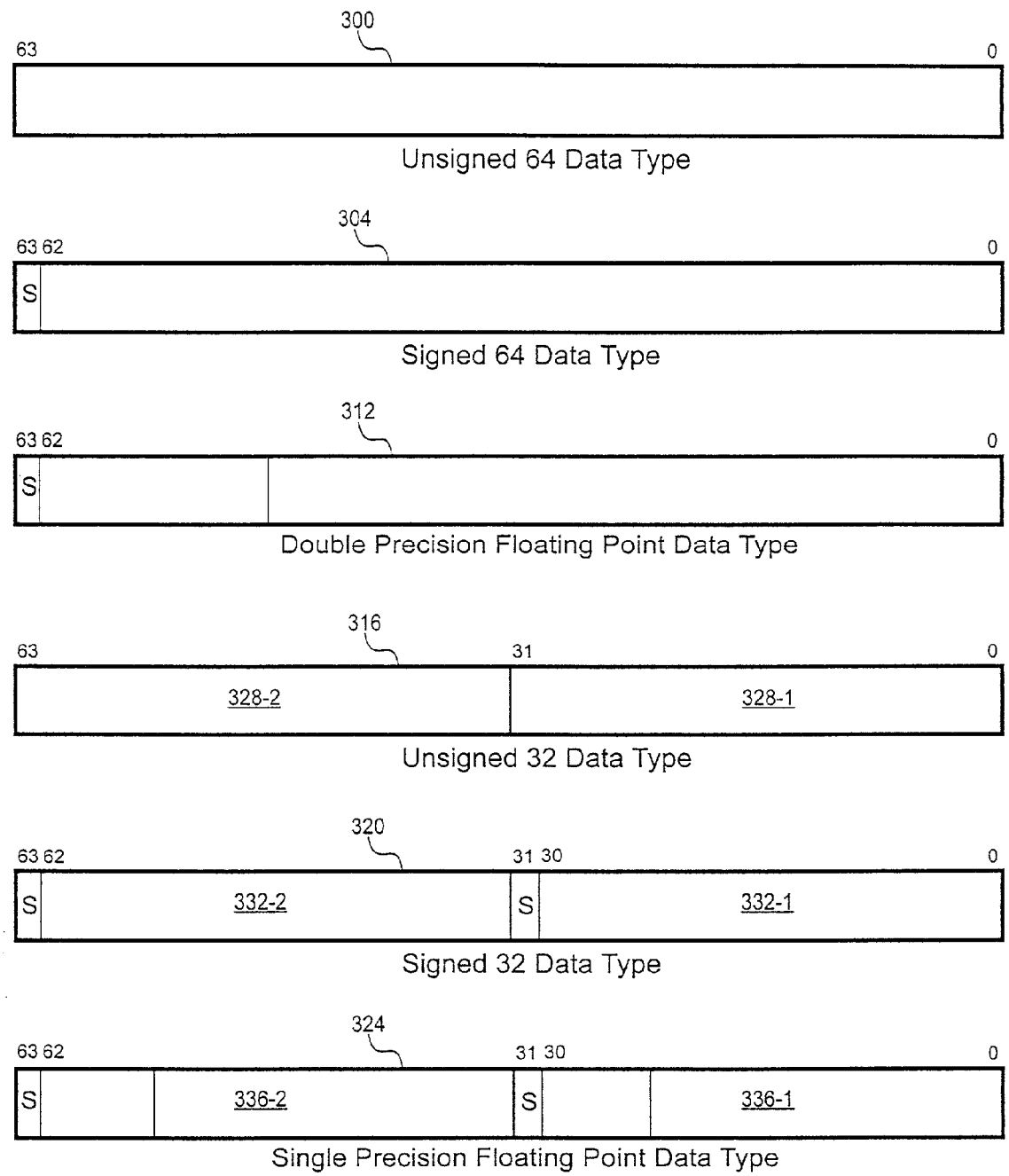
FIG. 3 is a diagram showing some data types generally available to the processor chip.

With reference to FIG. 3, some of the data types available for the compare sub-instructions are shown. In this embodiment, the registers are sixty-four bits wide. Some registers are not subdivided to hold multiple values, such as the signed 64 data type 300, unsigned 64 data type 304 and double precision floating point data type. In this embodiment, the IEEE standards for floating point registers (e.g., ANSI/IEEE std 754-1985) are used for the floating point data types. However, the partitioned data types hold two thirty-two bit values within the sixty-four bit register. As those skilled in the art appreciate, there are other possible data types and this invention is not limited to those described above.

Although there are a number of different data types, a given sub-instruction 54 may only utilize a subset of these. For example, one embodiment of the byte swap sub-instruction may only utilize floating point data types. However, other embodiments could use different data types. The following discussion generally relates to floating point compare operations, however, any data types could be compared in other embodiments of the present invention.

4. Compare Instruction

Figure 4:
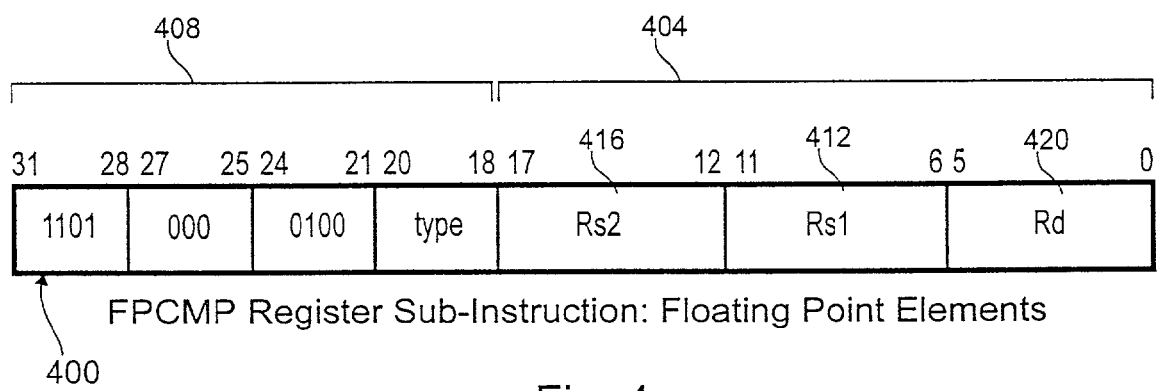
FIG. 4 is a diagram showing an embodiment of machine code syntax for the compare sub-instruction in one embodiment.

Referring next to FIG. 4, the machine code for a floating point compare sub-instruction ("FPCMP") 400 is shown. This sub-instruction uses the register addressing form 400 where Rs1 is the first input operand, Rs2 is the second input operand and Rd is the output operand. The compare sub-instruction 400 is thirty-two bits wide such that a four-way VLIW processor with a one hundred and twenty-eight bit wide instruction word 52 can accommodate execution of four sub-instructions 400 at a time. The sub-instruction 400 is divided into an address and op code portions 404, 408. Generally, the address portion 404 contains the information needed to load and store the operators, and the op code portion 408 indicates which function to perform upon the operators.

The compare sub-instruction 400 uses the register addressing format to reference three general-purpose registers. First and second source addresses 412, 416 are used to load first and second source registers from the register file. A destination address 420 is used to indicate where to store the results into a destination register that could be any general-purpose register. Since each register 412, 416, 420 is addressed with six bits in this embodiment, sixty-four registers are possible in an on-chip register file 60. In this embodiment, all loads and stores are performed with the on-chip register file 60. However, other embodiments could allow addressing registers outside the processing core 12.

What is meant by the term "general-purpose registers" is that any number of different instructions can store their output operands in that register. For example, the third register 524-3 may hold the result from an addition instruction and later hold the result from a compare instruction. In this embodiment, some of the sixty-four registers may be dedicated to a special purpose, such as holding the program counter.

Bits 31–18 of the sub-instruction are the op codes 408 which are used by the processing core 12 to execute the sub-instruction 54. Decode logic interprets the op codes 408 to configure the processing core 12 to implement the desired instruction. Various sub-instruction types may have differing amounts of bits devoted to op codes 408.

The type field of the op code 408 located in bits 18-20 indicates which type of compare to perform. Table I lists several different type fields which correspond to different ways for performing a floating point compare sub-instruction. For a type of 000, the input and output operands are single precision. In type field 001, a single instruction multiple data instruction is performed on subdivided registers which each contain two single precision integer values. A type conversion is combined with a performing a compare function in type 010. The first input operand in type 010 is double precision and the second input operand is single precision. Performing a type conversion and compare with a single instruction increases the efficiency of the code. Finally, type field 011 performs a compare on two double precision integer operands and returns a double precision result.

TABLE I

| Assembly Syntax | Type | Operand Description |
| --- | --- | --- |
| fcmp.s Rs1, Rs2, Rd | 000 | Single precision input operands; Single precision output operand. |
| pfcomp.s Rs1, Rs2, Rd | 001 | SIMD instruction with two single precision fields in each register; Single precision input operands; Single precision output operands. |
| fcmp.ds Rs1, Rs2, Rd | 010 | Rs1 is double precision; Rs2 is single precision; Double precision output operand. |
| fcmp.d Rs1, Rs2, Rd | 011 | Double precision input operands; Double precision output operands. |

Typically, a compiler is used to convert assembly language or a higher level language into machine code that contains the op codes. As is understood by those skilled in the art, the op codes control multiplexes, other combinatorial logic and registers to perform a predetermined function. Furthermore, those skilled in the art appreciate there could be many different ways to implement op codes.

5. Compare Implementation

The compare instruction determines the relationship between two register values. After execution of the instruction, an output operand is stored in the register file that can be read later to determine the relationship between the input operands. Knowing the relationship between the two input operands supports branches and conditionals that are commonly used in the running of software. The output register stores an integer which indicates a relationship between the input operands of greater than, less than, equal to, or not a number (NAN) as shown in Table II. Subsequent branch instructions can read the output register to determine up to four different branch paths that depend upon the value in the output register.

NAN values are defined in an IEEE standard (i.e., ANSI/IEEE Std. 754-1985) as invalid floating point values. The NAN value, which may be stored in the output register, indicates a comparison between the input operands is not possible. In other words, a NAN value means there is no valid relationship between the input operands. For example, comparing two positive infinity values would return NAN to the destination register. Although the following discussion is of an embodiment that compares floating point values, any data types could be compared in other embodiments including, for example, integer types.

TABLE II

| Relationship | Output Register |
| --- | --- |
| Rs1 is less than Rs2 | −1 |
| Rs1 is equal to Rs2 | 0 |
| Rs1 is greater than Rs2 | 1 |
| The relationship between Rs1 and Rs2 is indeterminate | Floating point compare not a number (NAN) |

Figure 5:
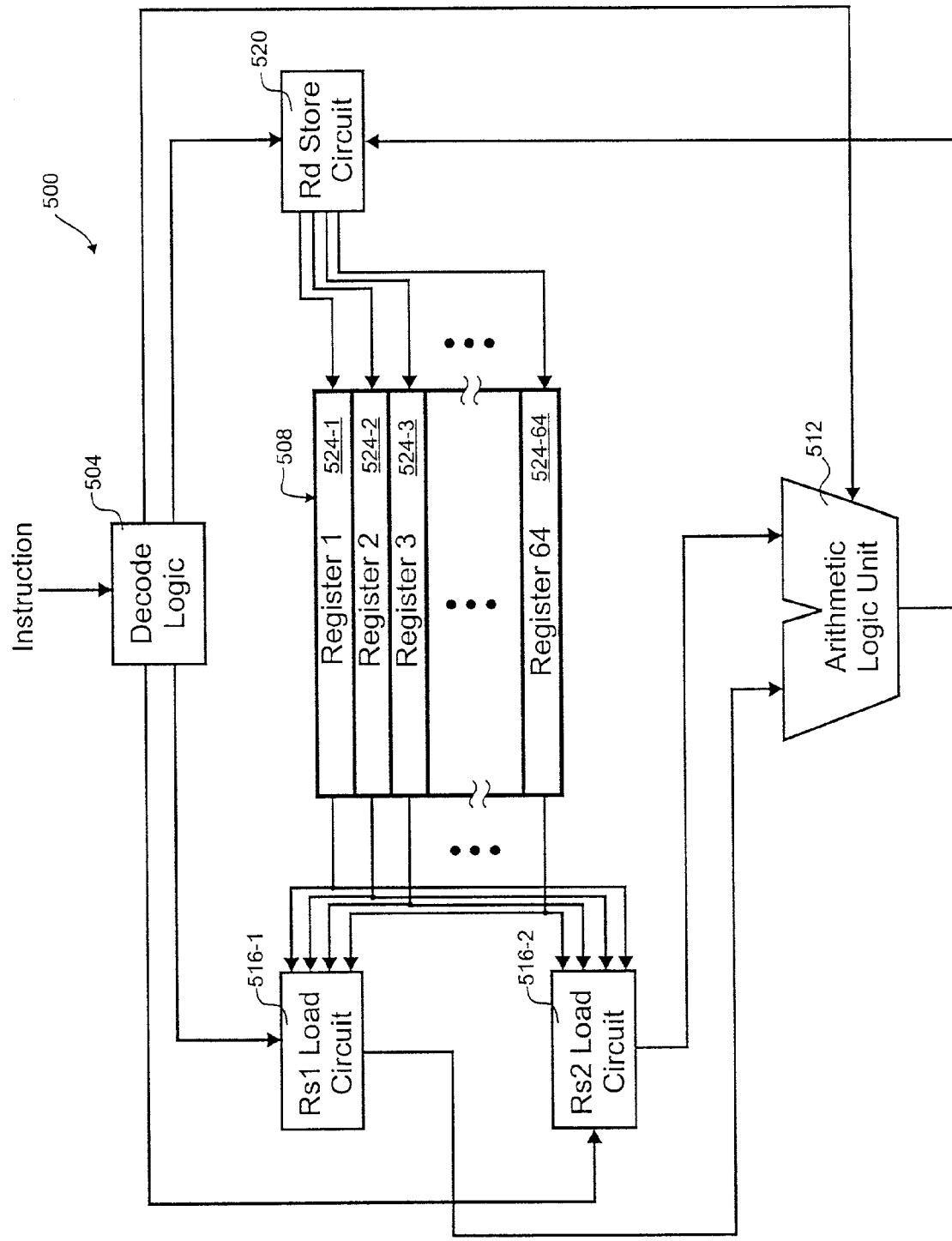
FIG. 5 is a block diagram which schematically illustrates an embodiment of the compare function.

With reference to FIG. 5, a block diagram of one embodiment of the compare operation is shown. This embodiment 500 allows writing the result from the compare to any general-purpose register 524 in the register file 508. In other words, a dedicated compare output register with an associated path to that register are not required. Included in the processing core 500 are decode logic 504, a register file 508, an arithmetic logic unit (ALU) 512, input operand load circuits 516, and an output operand store circuit 520.

The register file 508 holds the operands for an instruction. After execution of a particular instruction, the operands are available in the register file 508 for subsequent instructions to use. For example, the result from a compare operation could be used to determine if a counter had decremented to zero which would indicate a software loop were complete. Included in the register file 508 are about sixty-four general-purpose registers 524.

The machine code 400 for the compare instruction configures the processing core 500 to perform the compare operation. The op codes 408 and operand register addresses 404 are interpreted by the decode logic 504 to configure the processing core 500 accordingly. The decode logic 504 uses the op code 408 to configure the ALU 512 for a compare operation. The type field of the op code 408 is used to select the data type of the operands, as discuss above.

The register address 404 portion of the instruction is used by the decode logic 504 to select the proper registers 524 in the register file 508. The first input operand is read by the first load circuit 516-1 and the second input operand is read by the second load circuit 516-2. The load circuits 516 receive the input operand addresses 412, 416 from the decode logic 504 which are used to address the proper register 524 in the register file 508. Similarly, the output operand is written by the store circuit 520 to a register 524 in accordance with the output operand address 420 received from the decode logic 504.

The ALU 512 performs various operations upon the selected input registers to produce an output operand. For example, these operations include addition, subtraction and compare. The desired operation is provided to the ALU 512 by the decode logic 504 which determines the desired operation by analyzing the op code 408. After performing the instruction, the ALU 512 passes the result to the store circuit 520 that writes to the appropriate general-purpose register 524 in the register file 508. As those skilled in the art appreciate, the operation performed in the ALU 512 could be pipelined to reduce the effective latency required for execution. Furthermore, the load and store functions could also be pipelined to further reduce latency.

Figure 6:
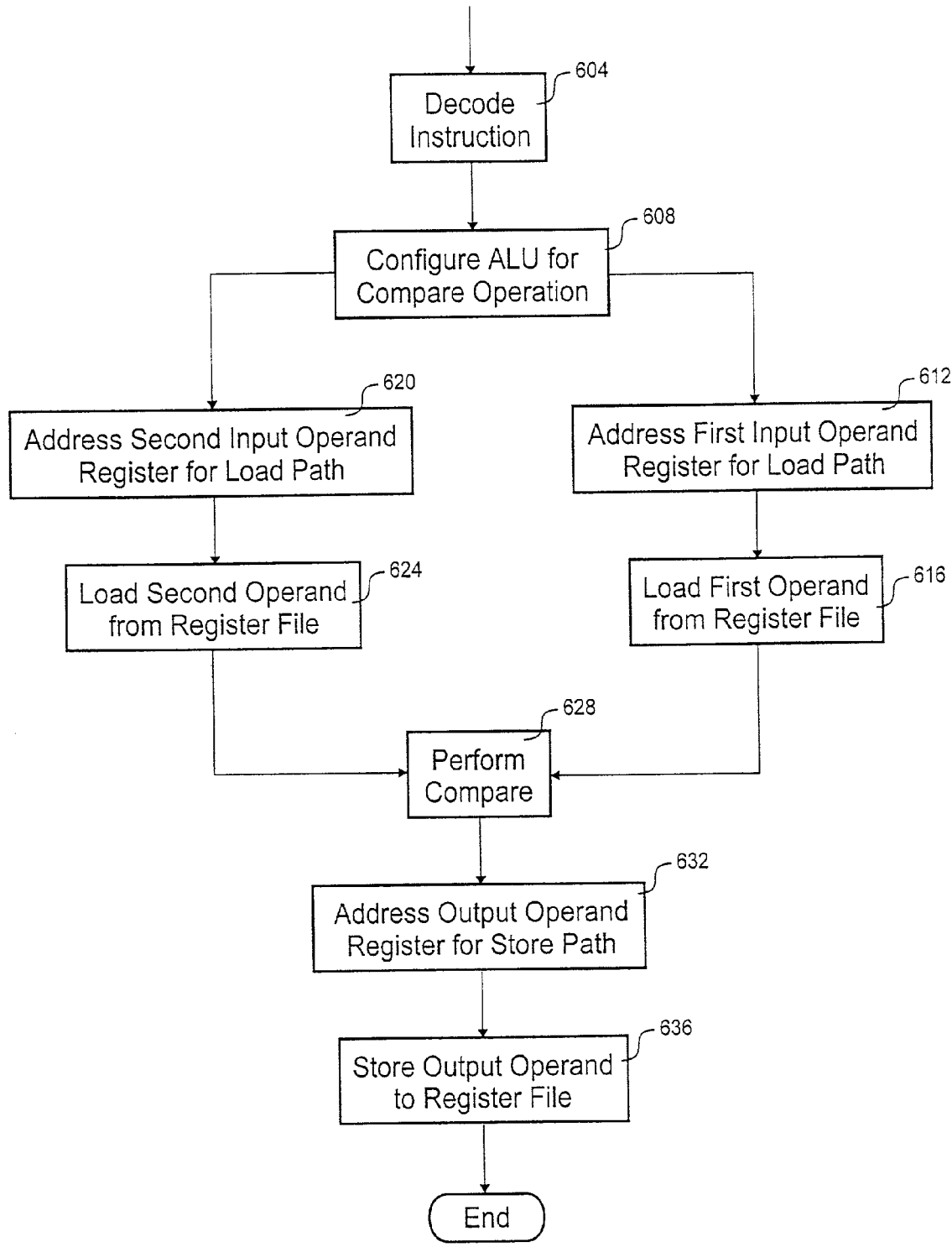
FIG. 6 is a flow diagram of an embodiment of a method for comparing two operands and storing the result in a general-purpose register.

Referring next to FIG. 6, a flow diagram is shown which depicts one embodiment of the steps for executing a compare instruction. In step 604, the instruction is decoded to determine which registers 524 to use for the operands and which function the ALU 512 should perform. The ALU 512 is configured in step 608 to execute a compare operation from the many different operations the ALU 512 could execute.

The address portion 404 of the instruction 400 is used to retrieve the register value 524 from the register file 508. In steps 612 and 620, the first and second input operand registers 524 are addressed such that a path from each addressed register 524 to the ALU 512 is created. Once the input registers 524 are properly addressed, the input operands are loaded into the ALU 512 from their respective registers 524 in steps 616 and 624.

After the input operands are loaded, processing may begin. In step 628, the compare operation is performed in the ALU 512. As is well known in the art, a compare is implemented by subtracting the operands and analyzing the result. From this analysis, a value is formulated which indicates the result. The above Table II provides the integer values used in this embodiment to indicate the various results.

Once the result is formulated by the ALU 512, it is stored in the register file 508. The destination address 420 portion of the instruction 400 indicates which register 524 the result is stored to. In step 632, the address of the output register 524 is provided by the decode logic 504 to the store circuit 520. The store circuit 520 uses the address to create a path between the ALU 512 and the output register 524. Once the path is configured, the output operand is stored in the selected register in step 636. In this way, a compare instruction is performed.

Although not shown in FIGS. 5 and 6, multiple compare sub-instructions could be executed in a single very long instruction word (VLIW). The use of general-purpose registers to store the output operands alleviates one problem with the conventional processing cores that use a dedicated comparison result register. In the present system, any number of general-purpose registers may be used to support simultaneously issued compare operations. Additionally, since there is no separate path to a dedicated compare register, circuit size and complexity is reduced.

CONCLUSION

In conclusion, the present invention provides a novel computer processor chip having a sub-instruction for comparing operands that allows performing several compares in a single issue, whereafter the result is written into a general-purpose register. While a detailed description of presently preferred embodiments of the invention is given above, various alternatives, modifications, and equivalents will be apparent to those skilled in the art. For example, although the operand processor only has a limited number of functions, other embodiments could include more functions. Therefore, the above description should not be taken as limiting the scope of the invention, which is defined by the appended claims.

What is claimed is:

1. A processing core that executes a compare instruction, the processing core comprising:
   a plurality of general-purpose registers comprising a first input operand register, a second input operand register and an output operand register;
   a register file comprising the plurality of general-purpose registers;
   comparison logic coupled to the register file, wherein:
      the comparison logic tests for at least two of a following relationships with the compare instruction alone: less than, equal to, greater than or no valid relationship,
      the comparison logic with the compare instruction alone produces a value, and
      the value has at least four states to represent the at least two relationships;
   decode logic, which selects the output operand register from the plurality of general-purpose registers; and
   a store path between the comparison logic and the selected output operand register, wherein the value is stored in the selected output operand register,
   wherein the compare instruction comprises a machine code instruction.

2. The processing core that executes the compare instruction as set forth in claim 1, wherein a very long instruction word includes a plurality of compare instructions.

3. The processing core that executes the compare instruction as set forth in claim 1, wherein said decode logic selects the first and second input operand registers from the plurality of general-purpose registers.

4. The processing core that executes the compare instruction as set forth in claim 1, wherein the processing core issues a plurality of compare instructions at one time.

5. The processing core that executes the compare instruction as set forth in claim 1, further comprising:
   a first load path between the first input operand register and the comparison logic; and
   a second load path between the second input operand register and the comparison logic.

6. The processing core that executes the compare instruction as set forth in claim 1, wherein the value is an integer.

7. The processing core that executes the compare instruction as set forth in claim 1, wherein:
   the first input operand register is a double precision floating point data type;
   the second input operand register is a single precision floating point data type; and
   the output operand register is a double precision floating point data type.

8. The processing core that executes the compare instruction as set forth in claim 1, further comprising a plurality of processing paths that are coupled to the register file.

9. The processing core that executes the compare instruction as set forth in claim 1, wherein the register file comprises special purpose registers which cannot store an output operand.

10. The processing core that executes the compare instruction as set forth in claim 1, wherein the value in the operand register can be written to a location outside of the processing core.

11. A method for performing a compare operation, the method comprising steps of:
   receiving a compare instruction comprising a machine code instruction;
   configuring first and second paths between a register file and comparison logic;
   configuring a third path between the comparison logic and the register file;
   comparing a first input operand and a second input operand with the compare operation alone, wherein the comparing step comprises step of:
      producing a result, which has at least four states to indicate at least two of a following mathematical relationships between the first input operand and the second input operand: less than, equal to, greater than, or no valid relationship; and
   coupling the result to a general-purpose register in the register file.

12. The method for performing the compare operation as set forth in claim 11, the method further comprising a step of enabling the comparison logic in an arithmetic logic unit.

13. The method for performing the compare operation as set forth in claim 11, wherein the configuring steps each comprise a step of addressing a general-purpose register in the register file.

14. The method for performing the compare operation as set forth in claim 11, wherein a compare operation is comprised within a very long instruction word.

15. The method for performing the compare operation as set forth in claim 11, wherein the comparing step comprises a step of converting a data type of at least one of the first or second input operands.

16. The method for performing the compare operation as set forth in claim 11, wherein the result can be written to a location outside of the processing core.

17. A method for executing a compare instruction in a processor, the method comprising steps of:
   issuing the compare instruction comprising a machine code instruction;
   comparing a first input operand and a second input operand to determine at least two mathematical relationships between the first and second input operands, wherein the compare instruction alone causes the comparing step;
   determining an output operand which has at least four states indicative of the at least two mathematical relationships; and
   storing the output operand in a general-purpose register of a register file, wherein the output operand alone indicates the at least two mathematical relationships between the first and second input operands.

18. The method for executing the compare instruction in the processor as set forth in claim 17, wherein the comparing step comprises at least two of the following steps:
   determining if the first input operand is less than the second input operand;
   determining if the first input operand is greater than the second input operand;
   determining if the first input operand is equal to the second input operand; or
   determining if there is no valid relationship between the first input operand and the second input operand.

19. The method for executing the compare instruction in the processor as set forth in claim 17, wherein the compare instruction is a very long instruction word which comprises a plurality of compare instructions which are processed in parallel down separate processing paths.

20. The method for executing the compare instruction in the processor as set forth in claim 17, wherein the general-purpose register is used to store operators from other types of instructions.

* * * * *